United States Patent
Dacosta

(10) Patent No.: US 9,311,394 B2
(45) Date of Patent: Apr. 12, 2016

(54) SPEECH RECOGNITION FOR INTERNET VIDEO SEARCH AND NAVIGATION

(75) Inventor: Behram Mario Dacosta, San Diego, CA (US)

(73) Assignee: Sony Corporation, Tokyo (JP)

(*) Notice: Subject to any disclaimer, the term of this patent is extended or adjusted under 35 U.S.C. 154(b) by 2599 days.

(21) Appl. No.: 11/590,386

(22) Filed: Oct. 31, 2006

(65) Prior Publication Data
US 2008/0103780 A1 May 1, 2008

(51) Int. Cl.
| | |
|---|---|
| *G10L 15/26* | (2006.01) |
| *H04N 21/61* | (2011.01) |
| *H04N 21/643* | (2011.01) |
| *G06F 17/30* | (2006.01) |
| *H04N 21/231* | (2011.01) |
| *H04N 21/422* | (2011.01) |
| *H04N 21/433* | (2011.01) |
| *H04N 21/438* | (2011.01) |
| *H04N 21/4415* | (2011.01) |

(52) U.S. Cl.
CPC .... *G06F 17/30787* (2013.01); *G06F 17/30825* (2013.01); *G10L 15/26* (2013.01); *H04N 21/23109* (2013.01); *H04N 21/42203* (2013.01); *H04N 21/4332* (2013.01); *H04N 21/4381* (2013.01); *H04N 21/4415* (2013.01); *H04N 21/6125* (2013.01); *H04N 21/64322* (2013.01)

(58) Field of Classification Search
USPC ...................................... 704/270, 270.1, 275
See application file for complete search history.

(56) References Cited

U.S. PATENT DOCUMENTS

| | | | | |
|---|---|---|---|---|
| 5,481,296 A | * | 1/1996 | Cragun et al. | 725/136 |
| 6,430,357 B1 | * | 8/2002 | Orr | 386/244 |
| 6,480,819 B1 | * | 11/2002 | Boman et al. | 704/9 |
| 6,543,052 B1 | * | 4/2003 | Ogasawara | 725/60 |
| 6,710,812 B2 | * | 3/2004 | Taylor et al. | 348/465 |
| 6,714,909 B1 | * | 3/2004 | Gibbon et al. | 704/246 |
| 6,889,191 B2 | * | 5/2005 | Rodriguez et al. | 704/275 |
| 7,184,959 B2 | * | 2/2007 | Gibbon et al. | 704/270 |
| 7,321,857 B2 | * | 1/2008 | Rodriguez et al. | 704/275 |
| 7,340,763 B1 | * | 3/2008 | Harris | 725/81 |
| 7,529,677 B1 | * | 5/2009 | Wittenberg | 704/275 |
| 7,689,589 B2 | * | 3/2010 | Wong et al. | 707/999.107 |
| 8,285,701 B2 | * | 10/2012 | Swart | H04N 7/17318 707/709 |
| 2002/0015106 A1 | * | 2/2002 | Taylor, Jr. | 348/465 |
| 2002/0143531 A1 | * | 10/2002 | Kahn | 704/235 |
| 2003/0028896 A1 | * | 2/2003 | Swart et al. | 725/127 |

(Continued)

FOREIGN PATENT DOCUMENTS

| | | | | |
|---|---|---|---|---|
| WO | WO9950826 A1 | 10/1999 | | G10L 3/00 |
| WO | WO 01/05155 A1 | 1/2001 | | H04N 7/173 |
| WO | WO0105155 A1 | 1/2001 | | |

OTHER PUBLICATIONS

Rabiner, L. and Juang, B. 1993 Fundamentals of Speech Recognition. Prentice-Hall, Inc. pp. 20-28.*

*Primary Examiner* — Matthew Baker
(74) *Attorney, Agent, or Firm* — John L. Rogitz

(57) ABSTRACT

Speech representing a desired video site or video subject is detected and digitized at a TV remote, and then sent to a TV. The TV or in some embodiments an Internet server communicating with the TV use speech recognition principles to recognize the speech, enter a database using the recognized speech as entering argument, and return a link to an Internet site hosting the desired video. The link can be displayed on the TV for selection thereof by a user to retrieve the video.

12 Claims, 1 Drawing Sheet

(56) References Cited

U.S. PATENT DOCUMENTS

| | | | |
|---|---|---|---|
| 2003/0061039 A1 | 3/2003 | Levin | 704/246 |
| 2003/0191629 A1 | 10/2003 | Yoshizawa | 704/10 |
| 2004/0199502 A1* | 10/2004 | Wong et al. | 707/3 |
| 2005/0114141 A1* | 5/2005 | Grody | 704/270 |
| 2005/0144009 A1 | 6/2005 | Rodriguez et al. | 704/275 |
| 2006/0004743 A1 | 1/2006 | Murao et al. | 707/4 |
| 2006/0028337 A1 | 2/2006 | Li | 340/539.1 |
| 2007/0016847 A1* | 1/2007 | Reichardt et al. | 715/500.1 |
| 2007/0234397 A1* | 10/2007 | Pearson et al. | 725/137 |

* cited by examiner

SPEECH RECOGNITION FOR INTERNET VIDEO SEARCH AND NAVIGATION

FIELD OF THE INVENTION

The present invention relates generally to speech recognition for Internet video search and navigation using TV-centric systems.

BACKGROUND OF THE INVENTION

The present invention recognizes that it can be difficult for a viewer to input textual information into a television using a remote control for various purposes. For example, if a user of an Internet-enabled TV would like to search the Internet for video related to "Subject A" so that the video can be played on the TV, there is no easy way to give the TV this information, unlike a computer which has a keyboard that can be used. A keyboard can be provided with a TV, but as understood herein this is not fully consistent with the relaxed user experience that is typically associated with watching television.

As also recognized herein, another option for allowing user input is to use a "soft keyboard" that appears on the screen, and that requires the user to use cursor keys on the remote control to select individual characters of the desired search subject. As also understood herein, however, such a way to input text is tedious.

SUMMARY OF THE INVENTION

A system includes a TV communicating with the Internet and a remote control device wirelessly communicating with the TV. A microphone is on the remote control device and the remote control device digitizes speech signals representing a desired video site or video subject from the microphone, sending the signals to the TV. A processor implements speech recognition on received speech signals representing a desired video site or video subject to generate recognized speech. This speech recognition is performed in the context of a grammer constructed from information within Internet video sites as well as information in the user's context of having viewed the TV content i.e. closed captioned text. This recognized speech is an index. A database containing at least one index correlating speech with Internet addresses can be accessed by the processor using the recognized speech to return an Internet address of an Internet site.

In one implementation, the processor and database are located at an Internet server. In another implementation, the processor and database are located in the TV. In this latter implementation, the database can include an index derived from closed captioned text received by the TV, EPG (electronic program guide) information, and/or text input by a user, for a predetermined time (e.g., only information received for a most recent predetermined time period) or for a predetermined data amount (e.g., only the most recent "X" amount of information received, wherein "X" is a predetermined data amount.) The database may also include information representing items that are initial, manufacturer-defined grammar.

In another aspect, a method for returning an Internet address of an Internet site storing a desired video includes digitizing speech input to a TV remote. The speech is related to the video. The speech is sent to a TV, and at least phonemes in the speech are recognized. Using the phonemes as entering argument, a database is accessed to retrieve the Internet address.

In still another aspect, a computer program product has a computer-readable medium that bears means for recognizing digitized speech representing a video and generating recognized speech in response. The speech is initially detected by a TV remote control. The computer program product also has means for accessing a data structure correlating speech representing video to Internet addresses of sites storing the video, and means retrieving, from the data structure, at least one Internet address correlated to a match.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
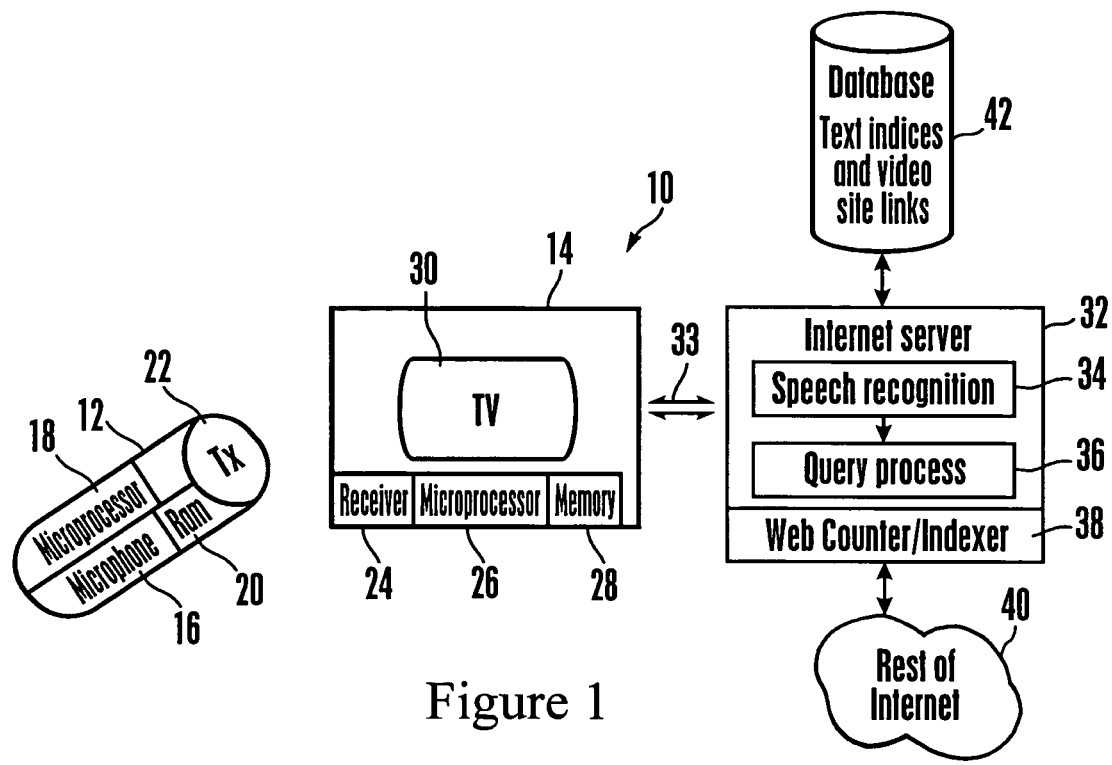
FIG. 1 is a block diagram of a first non-limiting embodiment of the present system.

Referring initially to FIG. 1, a system is shown, generally designated 10, that includes a wireless hand-held TV remote control device 12 that can control a TV 14 in accordance with remote control principles known in the art. In the non-limiting embodiment shown, among other components such as a remote control keypad, the remote 12 has a microphone 16 for receiving voice commands from a person and a remote control microprocessor 18 for digitizing the signals from the microphone 16. The signals if desired can be stored in memory 20 such as random access memory (RAM) and can be sent to the TV 14 by a RF or IR transmitter 22 in the remote 12, for reception of the signals by a receiver 24 in the TV 14.

The TV 14 can also include a TV processor 26 that can access a non-volatile TV memory 28 (NV RAM and/or hard disk drive/optical disk drive), and the TV processor 26 can be operably associated with a TV display 30 such as a flat panel display or cathode ray tube for displaying video thereon.

In the embodiment shown, the TV 14 can communicate with an Internet server 32 over a wired or wireless wide area network link 33 or other link in accordance with network principles known in the art. The server 32 includes a speech recognition module 34 which can recognize phonemes/words/phrases in digitized speech. The server 32 also includes a query processor 36 and a Web indexer/crawler 38 that can access the rest of the Internet 40 for purposes to be shortly disclosed to populate a text indices and video site links database 42 that is associated with the Internet server 32.

More specifically, the web crawler/indexer 38 navigates the Internet and generates reference indices that may be used to refer to videos. Non-limiting examples of the sources for words/phonemes in the indices of the database include (1) closed captioned text that appear with videos, (2) digitized voice "soundtracks" that accompany the video, which is analyzed for phonemes and then indexed, (3) descriptive text that appears with the video, and (4) actual image recognition on the video itself. These indices, together with the location (Internet site) of the corresponding videos, are stored in the database 42.

Figure 2:
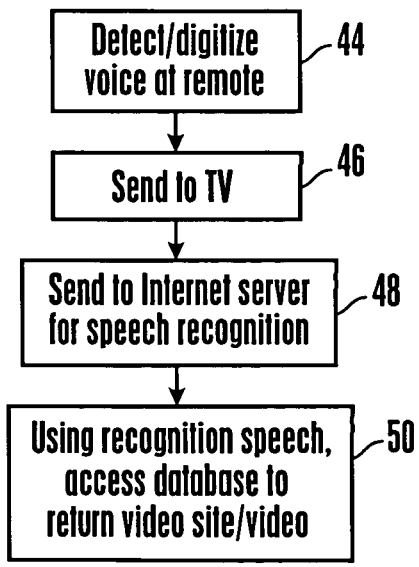
FIG. 2 is a flow chart showing a non-limiting logic that can be used by the system of FIG. 1.

With the above system architecture in mind, attention is drawn to FIG. 2 to understand one non-limiting method of the present invention. Commencing at block 44, speech is detected and digitized at the remote 12. The digitized speech is sent to the TV 14 at block 46 using the remote transmitter 22 and TV receiver 24, so that the TV processor 26 can relay the digitized speech at block 48 to the server 32 for recognition thereof by the speech recognition module 34. In accordance with one aspect of the invention, the speech discussed above is the title of a video, subject of a video, or location of a video on the Internet. The speech recognition module 34 can recognize the video subject or video site using methods known in the field of speech recognition, such as, e.g., matching and analyzing phonemes for the digitized speech and contents of the database 42.

As understood herein, speech recognition requires a context (grammar) to be accurate, and this grammar is provided by the information in the database 42. Accordingly, after speech recognition at block 48, the logic moves to block 50 to use the recognized phonemes to retrieve matching contents in the database 42. More specifically, at block 50 the recognized phonemes from block 48 are matched to phonemes/words in the indices of the database 42 and then the corresponding video site links are returned to the TV 14 where they can be displayed on the monitor 30 for selection of a link by the user by means of the remote 12, in order to retrieve the actual video content from the selected site. It is to be understood that the indices in the database may also be based on video speech "soundtrack" or the phonemes of video speech soundtracks as detected by the remote 12.

Figure 3:
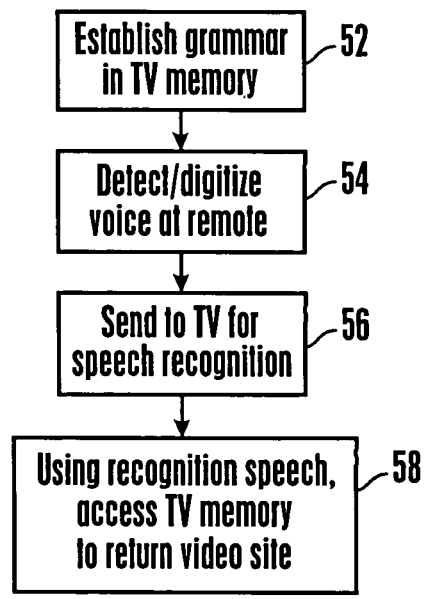
FIG. 3 is a flow chart showing an alternate non-limiting logic that can be used.

The speech recognition may occur using a further limited grammer, where the grammer is based on audio corresponding with video viewed by the user, or metadata corresponding to video viewed by the user. FIG. 3 shows an alternate logic that can be used and that is wholly contained within the home (TV 14 and remote control 12) without resort to accessing the server 32. At block 52 a limited grammar is maintained in the memory 28 of the television 14, so that memory and processing requirements to process this grammar are manageable within the confines of typical TV processors and storages. In one implementation, the limited grammar database may if desired include indices derived from the closed captioned text and metadata received by the TV, as well as text that the user might have downloaded from the Internet and other sources (e.g. QAM broadcast, IPTV, etc.) for a limited time or data amount, e.g., for the past "X" bytes or "Y" hours. The grammar may also include items that are input (trained) by the viewer and a limited, initial, manufacturer-defined grammar that is considered relevant to TV content selection that is permanently part of the memory 28.

Moving to block 54, speech is detected and digitized at the remote 12. The digitized speech is sent to the TV 14 at block 56 using the remote transmitter 22 and TV receiver 24, so that the TV processor 26 can execute speech recognition thereof by a speech recognition module accessible to the TV processor 26. After speech recognition at block 56, the logic moves to block 58 to use the recognized phonemes to retrieve matching contents in the TV memory 28, so that the corresponding video site links can be displayed on the monitor 30 for selection of a link by the user by means of the remote 12, in order to retrieve the actual video content from the selected site. The matching contents in this implementation may be larger sequences of words and phrases within EPG, metadata, and closed captioned text that contain the recognized speech, and may be passed to an Internet search engine to return addresses of web pages with contents that match the recognized speech. This speech recognition may occur entirely within the RC, or TV, or devices connected to the TV, or it different parts of the speech recognition may occur within all such devices.

The effect of the method of FIG. 3 is that the speech recognition will work reliably if the user speaks a phrase that has occurred during the broadcast in the past few hours, or if it has occurred in any web page in the past few days.

While the particular SPEECH RECOGNITION FOR INTERNET VIDEO SEARCH AND NAVIGATION is herein shown and described in detail, it is to be understood that the subject matter which is encompassed by the present invention is limited only by the claims.

What is claimed is:

1. A system, comprising:
  a TV communicating with the Internet;
  at least one remote control device wirelessly communicating with the TV;
  at least one microphone on the remote control device, the remote control device digitizing speech signals of a viewer of the TV and representing a viewer desired video site or video subject from the microphone and sending the signals to the TV;
  at least one processor coupled to the TV and implementing speech recognition on received speech signals representing a desired video site or video subject to generate recognized speech; and
  the processor accessing at least one database containing at least one index correlating speech with Internet addresses using the recognized speech to return at least one Internet address of an Internet site, wherein the database includes at least one index derived by the processor from closed captioned text in a televised video program received by the TV and provided to the processor.

2. The system of claim 1, wherein the database includes at least one index derived from text input by a user, for at least one of: a predetermined time, or predetermined data amount.

3. The system of claim 2, wherein the database contains only information received for a most recent predetermined time period.

4. The system of claim 2, wherein the database contains only the most recent "X" amount of information received, wherein "X" is a predetermined data amount.

5. The system of claim 2, wherein the database also includes information representing items that are initial, manufacturer-defined grammar.

6. A method for returning an Internet address of an Internet site storing a desired video, comprising:
  accessing closed captioned text received in televised video program;
  digitizing speech input to a TV remote by a viewer of the TV, the speech being related to the video;
  sending the speech to a TV;
  recognizing at least phonemes in the speech; and
  using the phonemes as entering argument, accessing a database including an index derived from the closed captioned text received in the televised video program to retrieve the Internet address.

7. The method of claim 6, comprising displaying the address on the TV for selection thereof by a user using the TV remote to retrieve the video from the Internet.

8. The method of claim 6, wherein the database contains only information received for a most recent predetermined time period.

9. The method of claim 6, wherein the database contains only the most recent "X" amount of information received, wherein "X" is a predetermined data amount.

10. A computer program product comprising:

a non-transitory computer-readable medium executable by a processor to cause the processor to undertake method acts comprising:

recognizing a viewer's digitized speech representing a video and generating recognized speech in response;

accessing a data structure correlating speech representing video to Internet addresses of sites storing the video, the data structure being generated at least in part using metadata received in video presented on the TV and/or closed caption text received in video presented on the TV; and retrieving, from the data structure, at least one Internet address correlated to a match of the recognized speech, wherein the processor and medium are wholly contained within the TV and/or the remote control without resorting to accessing a server to undertake the method acts, a limited grammar database being maintained in the TV so that memory and processing requirements to process the limited grammar database are manageable within the confines of the processor and medium, the limited grammar database including indices derived at least from the closed captioned text received by the TV for a past "X" bytes and/or a past "Y" hours, the limited grammar database not including indices derived from the closed captioned text received by the TV in excess of the past "X" bytes and/or received earlier than the past "Y" hours, such that a match to the recognized speech is returned only if the recognized speech contains content that has occurred during the broadcast in the past "Y" hours and/or if it has occurred in the past "X" bytes.

11. The computer program product of claim 10, wherein the data structure contains only information received for a most recent predetermined time period.

12. The computer program product of claim 10, wherein the data structure contains only the most recent "X" amount of information received, wherein "X" is a predetermined data amount.

* * * * *